Feb. 5, 1924.

H. E. McELWAIN 1,482,521

MACHINE FOR JOINING FILM STRIPS

Filed Feb. 1, 1921   3 Sheets-Sheet 1

Inventor.
Henry E. McElwain
by Heard Smith & Tennant.
Attys.

Feb. 5, 1924.

H. E. McELWAIN

1,482,521

MACHINE FOR JOINING FILM STRIPS

Filed Feb. 1, 1921    3 Sheets-Sheet 2

Inventor.
Henry E. McElwain
by Heard Smith & Tennant.
Attys.

Feb. 5, 1924. 1,482,521
H. E. McELWAIN
MACHINE FOR JOINING FILM STRIPS
Filed Feb. 1, 1921 3 Sheets-Sheet 3

Inventor.
Henry E. McElwain
by Heard Smith & Tennant.
Attys.

Patented Feb. 5, 1924.

1,482,521

UNITED STATES PATENT OFFICE.

HENRY E. McELWAIN, OF HOLYOKE, MASSACHUSETTS.

MACHINE FOR JOINING FILM STRIPS.

Application filed February 1, 1921. Serial No. 441,656.

*To all whom it may concern:*

Be it known that I, HENRY E. McELWAIN, a citizen of the United States, and resident of Holyoke, county of Hampden, State of Massachusetts, have invented an Improvement in Machines for Joining Film Strips, of which the following description, in connection with the accompanying drawing, is a specification, like characters on the drawing representing like parts.

This invention relates to a machine for joining or patching film strips whereby the ends of two film sections may be cemented together and the waste extremities trimmed off so as to produce a joint having a neat finish and with the frames properly registered.

One of the objects of the invention is to provide a machine for this purpose which is constructed with means operating to moisten the emulsion on one of the film sections at the point where the joint is to be made and then to remove the moistened emulsion, so that when the second film section is applied to the first-named film section to be cemented thereto, the bare films will contact with each other. This enables me to make a close joint which is much stronger than where the emulsion is not removed.

Another object of the invention is to provide novel means for trimming the waste ends of the film after the two film sections have been joined.

Still another object of the invention is to provide a machine which is compact in size and which is provided with a single actuating handle which is so connected with the operative parts that one movement of the handle will perform the complete operation of attaching or joining the films, including moistening the emulsion, removing the emulsion from the film, applying a cement to the film, pressing the two films together when they are properly registered to cause them to adhere with each other and trimming the waste ends of the film sections.

Other objects of the invention are to improve generally film joining machines all as will be more fully hereinafter set forth.

In order to give an understanding of my invention, I have illustrated in the drawings a selected embodiment thereof which will now be described after which the novel features will be pointed out in the appended claims.

Figure 5:
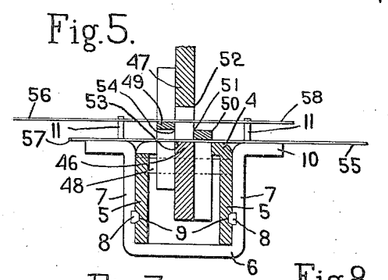
Fig. 5 is an enlarged section on the line 5—5, Fig. 4.
Figure 6:
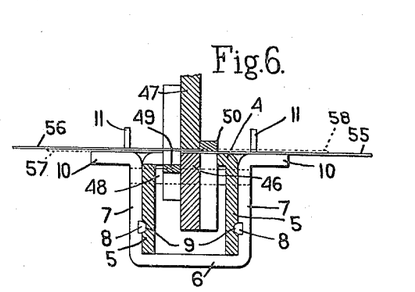
Fig. 6 is a view similar to Fig. 5 showing the relative position of the trimming knives and presser elements after the film strips have been pressed together and trimmed.

My improved machine comprises a frame which is shown as supported on a base or bed 1. The frame is formed with two end portions 2 and 3 which are connected by an intermittent or guiding portion 4. The end portion 2 supports the moistening device for moistening the emulsion, the means for removing the moistened emulsion and the cement applying device. The end portion 3 supports means for clamping the film sections together for effecting the final joining of them and the means for trimming the waste ends. These portions of the frame may be made in any suitable way but will preferably be made of sheet metal. The guiding portion 4 of the frame is also made of sheet metal pressed into shape and has a general U-shape as shown in Figs. 5 and 6, it having the two side flanges 5 which constitute means for guiding a film carriage 6 which moves longitudinally of the guiding portion and which operates to carry the film from the moistening and emulsion-removing device to the clamping and trimming device. This film carriage has a general U-shape with the sides 7 thereof embracing the flanges 5 of the frame, said carriage being maintained in its proper relation to the frame by gibs 8, carried thereby and operating in grooves 9 formed in the side walls of the frame. The means for shifting the carriage longitudinally of the frame will be presently described. The carriage is provided on each side with a flange or rest 10 to give the suitable support to the film and is also provided with positioning pins 11 which are adapted to be inserted through the holes 12 which are formed in the edge of the film, said pins being for the purpose of properly positioning the film sections on the carriage, so that the frames will register with each other.

Figures 1, 2, 3:
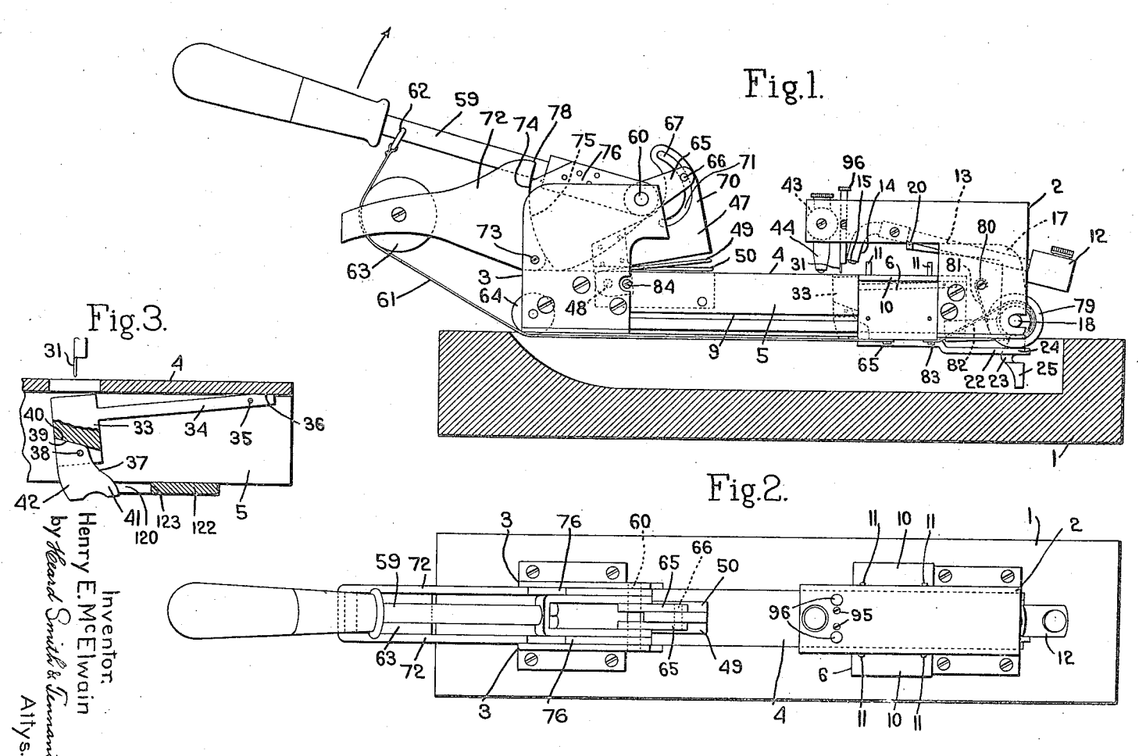
Fig. 1 is a side view of a machine embodying my invention.
Fig. 2 is a top plan view.
Fig. 3 is a vertical sectional view showing the operation of the vertically movable table for supporting the film while the emulsion is being removed.

As stated above the end portion 2 of the frame carries means for moistening the emulsion on the film, means for removing the moistened emulsion, and means for applying cement to the film. Any suitable means for properly moistening the emulsion may be employed but I will preferably employ a device which becomes operative to apply the moisture to the emulsion as the film is moved by the carriage. This emulsion moistening device is herein shown as comprising a tank 12 adapted to contain water and provided with a delivery pipe 13 having at its end a nozzle 14 through which projects a wick 15 adapted to engage and moisten the surface of the film as the film is moved by the carriage. The moistening device is pivoted to the frame at 16, and the pivot is so disposed that the weight of the tank 12 overbalances the weight of the nozzle so that the moistening device normally takes a position with the nozzle raised considerably above the line of travel of the film. Fig. 1 shows the carriage in its retracted position, and when in this position the positioning pins 11 are situated to the rear of the moistening nozzle. One of the film strips is placed on the carriage when it is in this position and movement of the carriage toward the left Fig. 1 will carry the film beneath the moistening nozzle.

Means are provided whereby during the movement of the film beneath said moistening nozzle, the latter is brought down into contact with the face of the film thereby to apply a band of moisture to the emulsion of the film as the film is carried beneath the nozzle. The means which I have herein illustrated for accomplishing this is a device actuated by the movement of the carriage, so that during the initial movement of the carriage from the position shown in Fig. 1, the reservoir 12 and pipe 13 will be automatically tilted to bring the wick into contact with the film.

Figure 9:
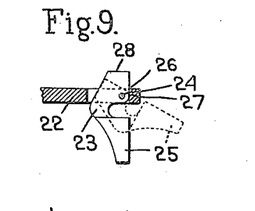
Fig. 9 is a detail of the dog for controlling the moistening device.
Figure 10:
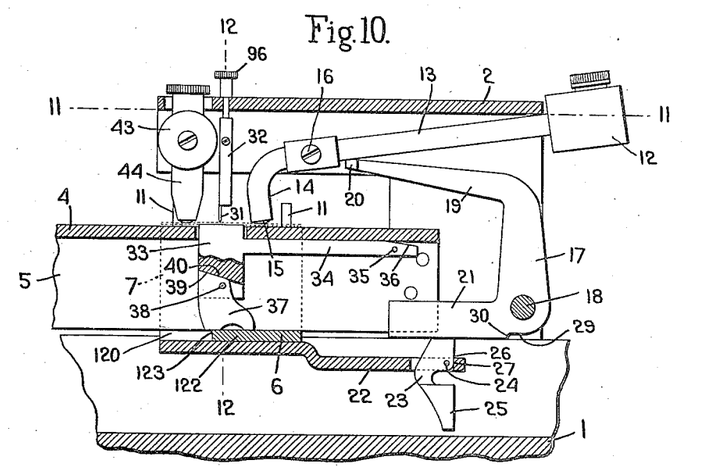
Fig. 10 is an enlarged sectional view showing the operation of the moistening device and emulsion removing device.
Figure 11:
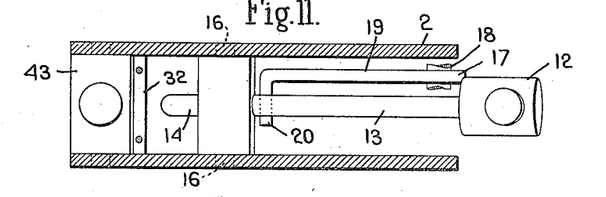
Fig. 11 is a section on the line 11—11, Fig. 10.

Pivotally mounted on the frame is an elbow lever 17, said lever being pivoted to turn about a rod 18 and having one arm 19 thereof bent forwardly and provided at its end with a laterally extending finger 20 that lies under the pipe 13 in the rear of the pivot 16. The other arm 21 of this elbow lever extends forwardly from the shaft or rod 18. I have provided means actuated by the carriage to rock the lever 17 thereby to tilt the nozzle 14. In Figs. 1, 2 and 10 a construction is shown in which the carriage 6 has an arm 22 extending rearwardly therefrom to the rear end of which a dog 23 is pivoted at 24. This dog is provided with an extension 25 which constitutes a weight that normally holds the dog in its vertical position shown in full lines Fig. 9. The dog is free to be swung into the dotted line position from the full line position but cannot swing in the opposite direction from the full line position because of the engagement of the portion 26 thereof with the shoulder 27 formed on the arm 22. When the carriage is in its retracted position, shown in Fig. 1, the upper end 28 of the dog is situated substantially beneath the shaft 18 and occupies a recess 29 formed in the rear end of the arm 21 of the elbow lever 17. When the carriage begins its movement to the left, Fig. 1, the dog engages the cam surface 30 at the end of the recess 29 and the continued movement of the carriage causes the dog to raise the arm 21 of the elbow lever, thus swinging the elbow lever about its pivot and raising the arm 19 thereof, as shown in Fig. 10. This action tilts the moistening device to bring the wick 15 into engagement with the film surface so that as the carriage continues its movement, the wick will leave a band of moisture on the surface of the film extending transversely thereof. The moistening device is held in this operative position so long as the dog 23 is riding underneath the arm 21, and the length of said arm 21 is such that the dog does not pass out from under it, until the film has been carried out from under the wick 15. After the carriage moves sufficiently to the left to withdraw the dog from the arm 21 then the elbow lever 17 and the moistening device will resume their normal position shown in Figs. 1 and 4. It will thus be seen that the moisture is automatically applied to the film by the movement of the carriage. When the carriage returns to its normal position, shown in Fig. 1, the dog 23 is merely swung out of the way, as shown in dotted lines Fig. 1. In Fig. 11 I have shown different means for actuating the lever 17 by the movement of the carriage. In this construction the frame has a lever 99 pivotally mounted thereon at 98, one end of the lever extending underneath the arm 21 of the lever 17 and the other end of said lever extending beneath the carriage when it is in its retracted position, and having a dog 97 pivotally mounted thereon which stands directly in front of the bottom of the carriage when the latter is fully retracted. With this construction the first movement of the carriage will bring the bottom thereof against the dog 97 thus rocking the lever 99 and causing the latter to actuate the lever 17 by which the moistening device is tilted. The moistening device will remain tilted in contact with the film so long as the dog 97 is in engagement with the bottom of the carriage but as soon as the carriage passes off from the dog then the parts will resume their normal position by gravity. The pivoted dog 97 permits the carriage to return to this normal position without actuating the lever 99.

Figures 7, 8:
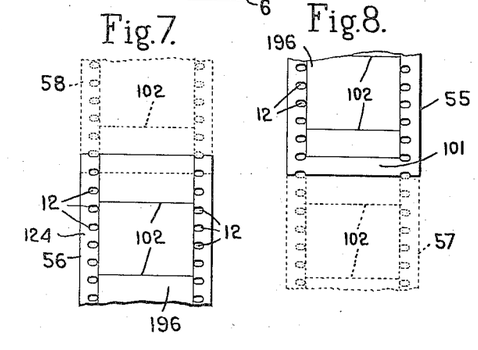
Figs. 7 and 8 show two film strips and illustrate the operation of the machine.

The emulsion on a film strip does not extend clear to the edge thereof but only occupies the space 196 between the rows of holes 12, as shown in Figs. 7 and 8. I propose to so design the moistening device that when the nozzle is first tilted the wick will be brought into contact with the film between the edge thereof and the emulsion so that the band of moisture will extend clear across the emulsioned portion of the film.

Figure 12:
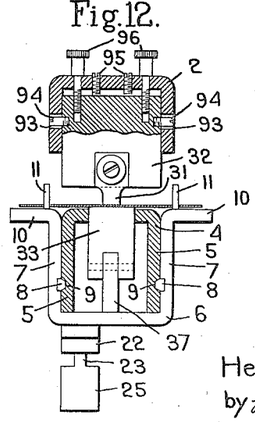
Fig. 12 is a section on the line 12—12, Fig. 10.
Figure 13:
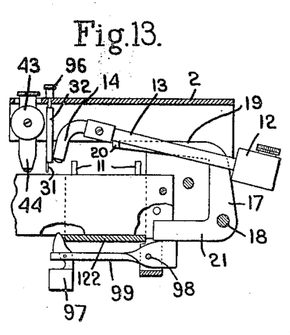
Fig. 13 shows a different means for operating the moistening device.
Figure 14:
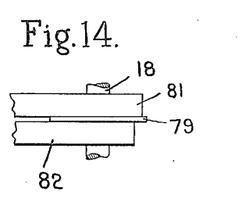
Fig. 14 is a detail of the return spring for the carriage.

As stated above the frame end 2 also carries means for removing the moistened emulsion from the film. The device for accomplishing this is in the form of a scraper or blade 31, which depends from a holder 32 that is suitably supported in the frame end. Fig. 12 shows one way of supporting the holder 32 in the frame. 96 indicates two shouldered screws which extend through the top of the frame end 2 and screw into the upper end of the holder 32, and 95 indicates two other screws which are screw-threaded into the frame 2 and form stop screws which engage the top edge of the holder. 94 indicates two other screws which are screw-threaded into the side edges of the holder and occupy slots 93 in the side walls of the frame 2. By means of these screws the holder 32 may be adjusted to the proper position and held rigidly in place. This blade 31 is so arranged that as the film is carried under it by the carriage, the edge of the blade engages the film where the emulsion has been moistened and thus scrapes the moistened emulsion from the film, thus leaving a band extending transversely of the film which is free from emulsion.

The moistening of the emulsion softens it so that it is easily removable by a scraper such as herein illustrated. In order that the scraper 31 may act properly it is, of course, necessary that it should have a scraping engagement with the film, and as the films are relatively thin, this means that the edge of the blade must be situated quite close to the plane of the upper face of the carriage. In order to facilitate the feeding of the film beneath the scraper without danger that the edge of the film will be brought against the scraper and at the same time to provide a support for the film while the scraper is acting thereon to remove the emulsion, I have illustrated herein a vertically movable table situated beneath the knife and which is normally depressed slightly so as to leave plenty of space for the edge of the film to pass between the table and the knife, but which is raised as soon as the edge of the film is passed beneath the edge of the knife, thereby to bring the film into position to be acted on by the knife. This table is shown at 33 and it is carried by the end of an arm 34 pivoted to the frame at 35. The arm extends beyond the pivot 35 and has the bevelled upper portion 36 which acts as a stop to limit the downward swinging movement of the table. This table normally occupies its lowered position, shown in Fig. 3, in which position there is plenty of room between it and the knife for the film to pass. The film is held down against the lowered table by the action of the moistening nozzle, so that the edge of the film will pass freely between the knife and the lowered table. As soon as the edge of the film has passed the knife then the table is raised to bring the film against the knife, this action being accomplished automatically by the movement of the carriage. The table has a dog 37 pivoted to its lower end as shown at 38, said dog being free to swing in one direction about its pivot but being limited in its movement in the other direction by the engagement of the face 39 thereof with the face 40 of the table.

The dog is so constructed that when the carriage is in its retracted position shown in Fig. 1, the lower end 41 of the dog will occupy a notch 120 formed in the bottom 122 of the carriage 6. At this time the weight of the table and the dog will cause the table to assume the lowered position, shown in Fig. 3, the bevelled face 36 of the arm 34 serving as a stop to limit the extent to which the table can move downwardly. As the carriage moves to the left in Fig. 1, the end wall 123 of the notch 120 strikes the foot portion 41 of the dog 37, and as the face 39 of the dog is in engagement with the face 40 of the table said end wall 123 will act on the dog with a camming action thus raising the table into the position shown in Fig. 10. The bottom of the carriage will then pass under the dog and the table will be held raised until the carriage passes out from under the dog, when the table will again assume its lowered position by gravity. When the table is raised the upper face thereof is situated slightly above the film rest 10. The parts are so timed that the raising of the table occurs just after the edge of the film has passed beneath the knife 31 and when the knife is over the portion 124 of the film between the edge thereof and the edge of the emulsion. When the table is in its raised position it presses the film against the knife or scraper so that during further movement of the carriage, said knife will scrape the emulsion from the film, thus leaving a band across the film which is free from emulsion, as shown at 101 in Fig. 8. The table will be raised to hold the film in contact with the knife until the film has passed entirely beyond the knife.

When the carriage returns to its initial position, the bottom thereof engages the dog 37 and merely swings it out of the way without giving vertical movement to the table.

The frame end 2 also carries a cement applying device adapted to apply a suitable cement to the film where the emulsion has been removed. The apparatus for accomplishing this comprises a tank 43 for holding the cement which is secured to the frame end 2 and has a depending nozzle 44, provided at its lower end with a wick 45 that is situated to engage the film where the emulsion has been removed as the carriage is moved to the left Fig. 4.

Figure 4:
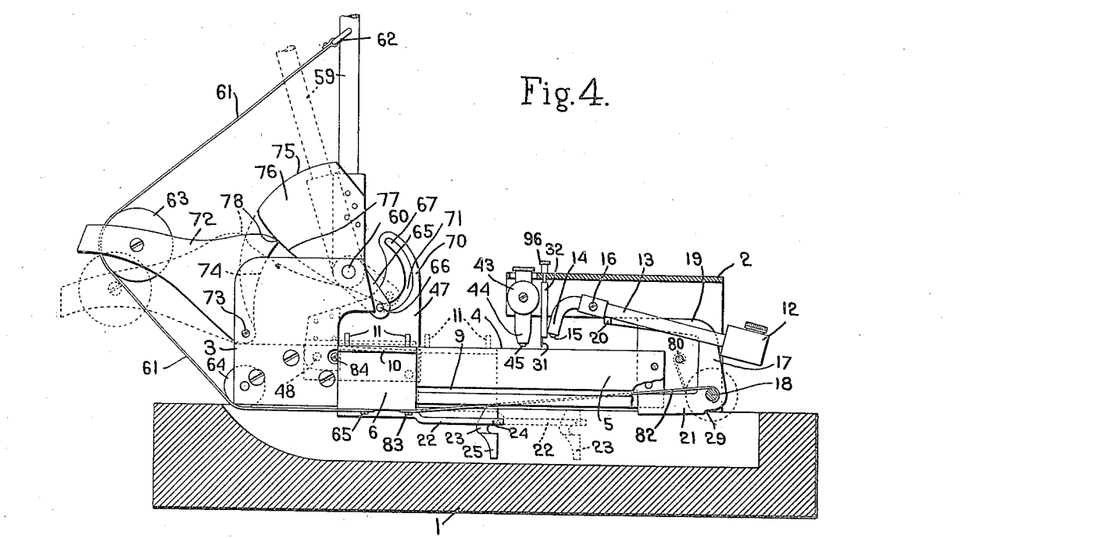
Fig. 4 is a side view partly in section showing the parts in the final position while the joined film is being pressed and trimmed.

From the above it will be seen that the movement of the carriage from the position shown in Fig. 1 to the dotted line position Fig. 4, will operate automatically to apply moisture to the film, to remove the moistened emulsion, and to apply a cement to the bare film where the emulsion has been removed.

When the carriage has been moved into the dotted line position Fig. 4 and one film section has been prepared for being joined to another film section, then said carriage is brought to rest and the second film section is placed on the positioning pins 11 with its frames properly aligned and registered with the frames on the first-named film section. The carriage is then given a further movement to the left to bring the positioned films into position to be clamped firmly together and to have their waste ends trimmed.

The means for clamping the films together comprises two clamping jaws 46, 47. The jaw 46 is rigidly supported by the frame and has its upper face in the plane of the rests 10. The clamping jaw 47 is pivotally mounted at 48 and is movable toward and from the stationary jaw 46. The clamping jaws are normally opened as shown in Fig. 1 to permit the two film strips to pass between them, and after the film strips are between the jaws, the jaw 47 is moved downwardly to clamp the two films together at the point where the cement is applied, thus cementing them and making a firm union.

Means are provided for trimming the waste ends of the film strips simultaneously with the clamping of the film strips together. This is accomplished by two shearing members 49 and 50 which cooperate with the clamping jaws, the latter having shearing edges for this purpose. The shearing member 50 is stationary and is situated above the plane of the film rests 10 so that the movement of the carriage into the position shown in Fig. 4 will carry the film section which has the emulsion removed therefrom beneath the shearing member 50. This shearing member 50 is situated at one side of the clamping jaws and the other shearing member 49 is situated on the opposite side and is rigid with the movable clamping jaw 47. The shearing member 49 has a position below the clamping face of the clamping jaw 47 so as to provide a space between said shearing member and said jaw into which the second film strip may be inserted. Said shearing member 49 is also situated so that when the clamping jaw is in its retracted position, shown in Figs. 1 and 5, said shearing member is above the film-supporting face of the carriage 6, thereby to permit the film which has the emulsion removed to pass beneath it. The shearing member 50 is provided with a shearing edge 51 and the clamping member 47 is provided with a shearing edge 52 which cooperates with the shearing edge 51. The lower clamping member 46 has a shearing edge 53 and the shearing member 49 is provided with a shearing edge 54 which cooperates with the shearing edge 53. The operation of clamping the film strip together and shearing the waste ends will be clearly understood from reference to Figs. 1, 5, 6, 7 and 8. The clamping jaw 47 and shearing member 49 are normally in their raised position shown in Fig. 1, so that when the carriage 6 completes its movement to the left, it will carry the first film section which has the emulsion removed therefrom and which is shown at 55, between the jaw 47 and both the shearing members 49 and 50. In placing the second film strip, shown at 56, on the carriage when the latter is in the dotted line position, Fig. 4, said second film strip is arranged with its edge above both shearing members and in the space between the shearing member 49 and the clamping jaw, as shown in Fig. 5. The carriage is then given its final movement to bring the films completely beneath the clamp member and the clamping member and shearing jaw 49 are then moved downwardly into position shown in Figs. 4 and 6. During this downward movement the shearing member 49 coacts with the shearing edge 53 of the stationary clamping member to cut off the waste end 57 of the film strip 55 and the shearing edge 52 of the upper clamping jaw 47 cooperates with the shearing edge 51 to cut off the waste end 58 of the upper film strip. The clamping jaws clamp the film strip together, as shown in Fig. 6, thus effecting the desired union between the said film strips. The device is so arranged that the clamping jaw 47 remains below or level with the bed of the frame until after the patched film is removed from the machine, this obviating the danger of breaking the patch while it is yet not set. In order to make a machine which is simple to operate, I have provided an actuating lever with suitable connections, so that one movement of the lever will result in giving the carriage its movement from the position shown in Fig. 1 to that shown in Fig. 4 and will also operate the clamping jaws and shearing device for clamping the films together and shearing the waste ends. Such operating lever is shown at 59 and it is pivoted to the frame end 3 at 60. It has secured thereto at 62 a flexible connection 61 which passes around suitable guiding pulleys 63 and 64 and is connected to the underside of the carriage at 65. With this arrangement the swinging of the operating lever 59 in the direction of the arrow, Fig. 1 will result in drawing the carriage to the left.

It will be noted that in the operation of the device, the carriage is brought into the position shown in Fig. 4 before the clamping jaws and shearing members begin to operate and I have therefore provided such connections between the operating lever and the other parts, so that during the first movement of the lever, the carriage 6 only will be operated, the clamping jaws remaining stationary, and during the final movement of the lever the carriage will remain stationary while the clamping jaws are actuated. The lever 59 is provided with an extension 65 having a pin 66 operating in a slot 67 formed in an extension 70 rising from the clamping jaw 47. The upper portion of this slot 67 from the top to about the point 71 is concentric with the center 60 when the jaw is in its elevated position so that during the first movement of the actuating lever, the pin 66 merely operates in the concentric portion of the slot and does not give any movement to the jaw 47. By the time the carriage has been moved into the position shown in Fig. 6, the actuating lever will be in about the position shown in dotted lines Fig. 4, and further movement of the lever into the full line position shown in Fig. 4, will cause the pin 66 to operate in the lower end of the slot which is eccentric to the center 60, said slot having such a shape that during this final movement of the lever, the jaw is moved downwardly into the position shown in Fig. 4. In order to permit the further movement of the lever from the dotted line position to the full line Fig. 4, while the carriage 6 is stationary in the position shown in full lines Fig. 4, I have provided a yielding support for the idler 63 which permits said idler to move and thus provide the necessary slack in the connection 61 to permit of this final movement of the lever. The idler 63 is pivotally mounted on a support 72 which in turn is pivoted at 73 to the frame end 3. The support 72 is formed with a curved surface 74 which engages the end surface 75 of a wing portion 76, that is rigid with the lever 59. The curved edge 74 of the member 72 is formed on the arc of a circle with the point 60 as the center so that during the swinging movement of the lever 59 from the position shown in Fig. 1 to that shown in dotted lines, Fig. 4, the wing 76 moves over the curved surface 74, but holds the support 70 rigidly in the position shown in Fig. 1. As soon as the lever has been brought into position shown in dotted lines, Fig. 4 with the carriage at the left hand limit of its movement, the wing 76 passes off from the curved surface 74, thus permitting the member 72 to swing forwardly and give up slack to the connection 61. The wing 76 is provided with a cam face 77 with which the corner 78 of the support 72 has engagement during the final movement of the lever and this cam surface 77 is so shaped that the upward swinging movement of the support 72 will be just sufficient to accommodate the forward movement of the lever 59 while holding the connection 61 taut. This permits the final movement of the lever necessary to clamp the films together and sever them without bringing undue strain on the connection 61.

After the films have been cemented and severed the handle 59 is returned to its initial position shown in Fig. 1 and during this operation the cam face 77 swings the support 72 backwardly to take up the slack in the connection 61 as the lever swings downwardly and the parts are returned to their normal position.

I have shown herein a return spring for returning the carriage to the position shown in Fig. 1. This spring is a coil spring 81 encircling the shaft 18 and having one end secured to the frame end 2 as shown at 80, the other end of said spring being connected to shaft 18. 82 is a flexible connection, one end of which is connected to the carriage at 83 which is wound about the shaft 18. The movement of the carriage from the position shown in Fig. 1 to that shown in Fig. 4 will unwind the connection 82 from the shaft and wind up the spring, and when the lever is returned to its inward position, shown in Fig. 1, the spring will act through the connection 82 to return the carriage to its initial position.

I claim:

1. In a machine for joining film strips, the combination with means to moisten the emulsion on a film strip, of means to remove the moistened emulsion, a pair of clamping members having opposed faces for pressing films between them, each having a shearing edge.

2. In a machine for joining film strips, the combination with means to moisten the emulsion on a film strip, of means to remove the moistened emulsion, a pair of relatively-movable clamping members having opposed faces for pressing films between them, each of which has a cutting edge, and a shearing member rigid with each clamping member.

3. In a machine for joining film strips, the combination with means to moisten the emulsion on a film strip, of means to remove the moistened emulsion, a pair of relatively-movable clamping members, each of which has a pair of film-receiving slots, a shearing member rigid with each clamping member and co-operating with the other clamping member to sever the waste ends of the film.

4. In a machine for joining film strips, the combination with means to apply moisture to the emulsion on a film strip, of means to remove the moistened emulsion, a pair of relatively-movable clamping members, each having a shearing edge, a shearing member rigid with each clamping member and forming therewith a slot to receive the film, and means to move the clamping members thereby to cause the shearing members to sever the film ends and to press the films together.

5. In a machine for joining film strips, the combination with means to moisten the emulsion on a film strip, of means to remove the moistened emulsion, means to cement another film strip to the first-named film strip at the point where the emulsion has been removed, and means to sever the waste ends from each film strip adjacent the joint.

6. In a machine for joining film strips, the combination with means to moisten the emulsion on a film strip, of a stationary scraper, means to move the moistened film strip relative to the scraper to cause the latter to scrape the moistened emulsion from the film strip.

7. In a machine for joining film strips, the combination with means to moisten the emulsion on a film strip, of a stationary scraper, means to move the moistened film strip relative to the scraper, to cause the latter to scrape the moistened emulsion from the film, and means to cement another film strip to the first-named film strip at the point where the emulsion has been removed.

8. In a machine for joining film strips, the combination with a frame, of a film carriage movably mounted thereon, a stationary emulsion-removing device supported on the frame, and means to move the film carriage to carry the film supported thereby past the emulsion-removing device, thereby to cause the latter to remove the emulsion from a portion of the film strip.

9. In a device for joining film strips, the combination with a frame, of a film carriage movably mounted thereon, a stationary emulsion-removing scraper mounted on the frame, and means to move the film carriage beneath the scraper whereby the latter will scrape the emulsion from a section of the film carried by the carriage.

10. In a machine for joining film strips, the combination with a frame, of a film carriage movably mounted thereon, a stationary emulsion-removing element mounted on the frame, means to move the carriage relative to said emulsion-removing element to cause the latter to act on and remove the emulsion from a portion of a film strip mounted on the carriage, and means to moisten the emulsion before it is acted on by said emulsion-removing element.

11. In a machine for joining film strips, the combination with a frame, of a film carriage movably mounted thereon, means actuated by the movement of the carriage to moisten the emulsion on a film strip supported by the carriage, and means to remove the moistened emulsion.

12. In a film joining machine, the combination with a frame, of a film carriage movably mounted thereon, means actuated by the movement of said carriage to moisten the emulsion on a film strip, supported by the carriage, and a stationary scraper beneath which the carriage moves and which operates to scrape the moistened emulsion from the film strip.

13. In a film joining machine, the combination with a frame, of a film carriage movably mounted thereon, an emulsion moistening element pivotally mounted on the frame, means to tilt the moistening element by the movement of the carriage to cause it to apply a band of moisture transversely across the emulsioned side of the film.

14. In a film joining machine, the combination with a frame, of a film carriage movably mounted thereon, an emulsion moistening element pivotally mounted on the frame, means to tilt the moistening element by the movement of the carriage to cause it to apply a band of moisture transversely across the emulsioned side of the film, and means to remove the moistened emulsion.

15. In a film joining machine, the combination with a frame, of a film carriage movably mounted thereon, an emulsion moistening element pivotally mounted on the frame, means to tilt the moistening element by the movement of the carriage to cause it to apply a band of moisture transversely across the emulsioned side of the film, and a scraper stationarily supported by the frame and adapted to remove the moistened emulsion as the carriage moves.

16. In a film joining machine, the combination with a frame, of a film carriage movably mounted thereon, and means operative during the movement of the carriage to apply a band of moisture transversely across the emulsioned side, of a film strip supported by the carriage, to remove the moistened emulsion, and to apply cement to the film strip where the emulsion has been removed.

17. In a machine for joining film strips, the combination with a frame, of a film carriage movable mounted thereon, means operated during the movement of the carriage to remove the emulsion from a film strip carried by the carriage and to apply cement to the film strip where the emulsion has been removed, means for clamping a second film strip against the cemented portion of the first-named film strip to join said film strips, means to cut waste ends from both film strips, and a single actuating member by which the carriage is given its movement and the film-clamping and film-cutting means are operated.

18. In a machine for joining film strips, the combination with a frame, of a film carriage movably mounted thereon, means operative during the movement of the carriage to remove emulsion from the film strip supported by the carriage and to apply cement to said film strip where the emulsion has been removed, a pair of clamping jaws for clamping two film strips together, cutting means for cutting from each film strip the waste ends adjacent the clamping jaws, and a single actuated lever operatively connected to said carriage, said clamping means and said cutting means, and by which all of said devices are actuated.

19. In a machine for joining film strips, the combination with a frame, of a film carriage movably mounted thereon, means operative during the movement of the carriage to remove emulsion from the film strip supported by the carriage and to apply cement to said film strip where the emulsion has been removed, a pair of clamping jaws for clamping two film strips together, cutting means for cutting from each film strip the waste ends adjacent the clamping jaws, an actuating member operatively connected to said carriage, said clamping means and said cutting means, and adapted during the first part of its movement to move the carriage without actuating the clamping means and cutting means, and during the latter part of its movement to actuate the clamping means and cutting means without actuating the carriage.

20. In a film joining machine, the combination with a frame, of a film carriage movably mounted thereon, means actuated by the movement of the carriage to apply a band of moisture across the emulsioned side of a film supported by the carriage, means operative during the movement of the carriage to remove the moistened emulsion and to apply cement to the film strip where the emulsion has been removed, a pair of clamping jaws for clamping a second film strip against the cemented film strip, a film cutting member associated with said jaws, a pivoted actuating lever, and operative connections between said lever, the carriage, the clamping jaws and the cutting member by which the first movement of the lever gives the carriage its movement without actuating the clamping jaws and cutting members and the final movement of the lever actuates the clamping jaws and cutting members without moving the carriage.

21. In a film joining machine, the combination with a frame, of a film carriage movably mounted thereon, an emulsion-removing device situated above the carriage and adapted to engage the emulsioned side of a film on the carriage as the latter moves, and means to press the film against said emulsion-removing device.

22. In a film joining machine, the combination with a frame, of a film carriage movably mounted thereon, an emulsion-removing device situated above the carriage and adapted to engage the emulsioned side of a film on the carriage as the latter moves, and means actuated by the movement of the carriage to press the film against said emulsion-removing device.

23. In a film joining machine, the combination with a frame, of a film carriage movably mounted thereon, a stationary scraper situated above the carriage and adapted to engage the emulsioned side of a film mounted on the carriage, thereby to scrape the emulsion therefrom, and means to press the film against the scraper as the carriage moves.

24. In a film joining machine, the combination with a frame, of a film carriage movably mounted thereon, a stationary scraper situated above the carriage and adapted to engage the emulsioned side of a film mounted on the carriage, thereby to scrape the emulsion therefrom, and means actuated by the movement of the carriage to press the film against said scraper.

25. In a film joining machine, the combination with a frame, of a film carriage movably mounted thereon, an emulsion-removing scraper situated above the carriage, a vertically movable element carried by the frame and situated beneath said scraper, and means to raise said element as the film passes thereover, thereby to press the film against the scraper.

26. In a film joining machine, the combination with a frame, of a film carriage movably mounted thereon, an emulsion-removing scraper situated above the carriage, a vertically movable element carried by the frame and situated beneath said scraper, and means actuated by the movement of the carriage to raise said element, thereby to press the film against the scraper.

In testimony whereof, I have signed my name to this specification.

HENRY E. McELWAIN.